UNITED STATES PATENT OFFICE.

THEODORE B. WAGNER, OF CHICAGO, ILLINOIS.

PRESERVED MILK.

934,641.  Specification of Letters Patent.  Patented Sept. 21, 1909.

No Drawing.  Application filed June 25, 1907.  Serial No. 380,784.

*To all whom it may concern:*

Be it known that I, THEODORE B. WAGNER, a citizen of the United States, residing at Chicago, in the county of Cook and State of Illinois, have invented an Improvement in Preserved Milk, of which the following is a clear and exact description.

My invention relates to the preparation of a food product obtained from milk and crystallized dextrose, the latter preferably in its anhydrous form. The new food product thus obtained may be preserved indefinitely and is capable of resisting climatic changes under reasonable conditions and if kept in proper receptacles. It is readily soluble in water, free from obnoxious sweetness, and on standing in a sealed receptacle it does not separate any solid matter. My new product practically remains as wholesome as fresh milk, preserving a sweet milk flavor and, when properly diluted, the natural taste of fresh milk. According to the degree of concentration of the milk and according to the amount of dextrose added, the product may vary in its consistency, it may be semi-solid or it may be a creamy liquid. The dextrose to be employed is best that kind now known under the trade-name of "Crystallized anhydrous grape sugar" which is the subject matter of my U. S. Patent No. 835,145 of November 6th 1906. At all events, it must be so pure that it does not introduce anything which might counteract the preserving properties of the dextrose, or change the flavor or appearance of the finished product.

In carrying out my process practically, I can proceed as follows, the parts given being by weight: I take about 4500 parts of whole milk, heat to approximately 185 degrees Fahrenheit and draw about 3500 parts of it into a vacuum pan. I then add to the remainder of the milk about 650 parts of crystallized anhydrous dextrose and thoroughly dissolve it by heating and stirring and subsequently draw this also into the vacuum pan. I then evaporate *in vacuo* at a temperature of about 135–140 degrees Fahrenheit, until the contents reach a density corresponding to approximately 31 degrees Baumé. I now allow the contents to cool in the pan to about 120 degrees Fahrenheit, then break the vacuum and draw off the product into suitable receptacles, in which it is rapidly cooled to about 60 degrees Fahrenheit. If intended for case goods, the receptacles are subsequently sealed.

Having now described my invention and in what manner the same is to be performed, what I claim as new, and desire to secure by Letters Patent, is:

1. A preserved milk condensed from a mixture of milk and crystallized dextrose, free from all other preservatives and free from obnoxious sweetness, readily soluble in water, containing the solid ingredients of milk in substantially the same form in which they are contained in fresh milk and which may be preserved indefinitely and is capable of resisting all climatic changes substantially as described.

2. A preserved milk condensed from a mixture of milk and crystallized anhydrous dextrose, free from all other preservatives and freed from obnoxious sweetness, readily soluble in water, containing the solid ingredients of milk in substantially the same form in which they are contained in fresh milk and which may be preserved indefinitely and is capable of resisting all climatic changes substantially as described.

In testimony whereof I have subscribed my name in the presence of two witnesses.

THEODORE B. WAGNER.

Witnesses:
 E. F. HEYD,
 P. MILLER.

Correction in Letters Patent No. 934,641.

It is hereby certified that in Letters Patent No. 934,641, granted September 21, 1909, upon the application of Theodore B. Wagner, of Chicago, Illinois, for an improvement in "Preserved Milk," an error appears in the printed specification requiring correction as follows: Line 75, the word "freed" should read *free;* and that the said Letters Patent should be read with this correction therein that the same may conform to the record of the case in the Patent Office.

Signed and sealed this 19th day of October, A. D., 1909.

[SEAL.]

C. C. BILLINGS,
*Acting Commissioner of Patents.*